United States Patent Office 3,787,506
Patented Jan. 22, 1974

3,787,506
FIRE RETARDANTS FOR POLYMERS
Gary A. Ungefug, R. Garth Pews, and Richard T. Dickerson, Midland, Mich., assignors to The Dow Chemical Company, Midland, Mich.
No Drawing. Continuation-in-part of application Ser. No. 876,998, Nov. 14, 1969. This application Sept. 4, 1970, Ser. No. 69,927
Int. Cl. C07c 43/20
U.S. Cl. 260—613 R
11 Claims

ABSTRACT OF THE DISCLOSURE

Compounds having the general formula

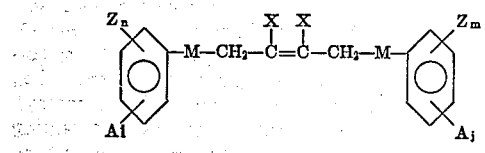

each X independently, forming either the cis or trans isomer, is F, Cl, Br, I or H where not more than one X is H,
each M independently is O or S,
each Z independently is Cl or Br,
each A independently is an inert substituent, such as F, I, methyl, phenyl, hydroxy, methoxy, nitro, carboxy, acetoxy, cyano, amino or sulfo,
$n$ and $m$ are integers of 1 to 5 provided that when $n=m=1$ then each Z and X is Br and M=O and provided that when one X is H then $n$ and $m$ are integers of 3 to 5, and
$i$ and $j$ are integers of 0 to 2 where $i \leq n-1$ and $j \leq m-1$ impart excellent fire retarding properties to polystyrene and are stable when extruded or molded with polystyrene at temperatures above 200° C.

CROSS-REFERENCE TO RELATED APPLICATIONS

This application is a continuation-in-part of our earlier application Ser. No. 876,998 filed Nov. 14, 1969, now abandoned.

BACKGROUND OF THE INVENTION

Moyle, in U.S. Pat. 2,488,499, teaches the use of 1,4-di(halophenoxy)-2-butenes as modifying agents in plastic compositions. Such compounds, however, cannot be extruded or molded with polystyrene at temperatures above 200° C. without deleteriously affecting the product. For example, 1,4-di(2,4,6-tribromophenoxy)-2-butene molded with polystyrene at 225° C. discolors the plastic.

Dickerson and Tousignant in U.S. Pat. 3,372,141 have employed small quantities of bromoalkenyl ethers in polystyrene to make polystyrene self-extinguishing. Such compounds, however, are not as stable as those of the invention.

Due to the great concern for the flammability of various plastic materials, the need for a suitable fire retardant for polystyrene-containing plastics has become manifest. Modern appliances encased in polystyrene plastics now operate at higher temperatures than ever before. Unfortunately, polystyrene casements are combustible at high temperatures under unusual operating conditions.

Fire retardant additives for polystyrene have either decomposed at extrusion or molding temperatures, causing discoloration, or they have not been compatible with the polystyrene. Thus, even though exhaustive searches have been made for suitable fire retardant agents for polystyrene, none has been found to be totally acceptable.

SUMMARY OF THE INVENTION

According to the present invention, compounds having the general formula

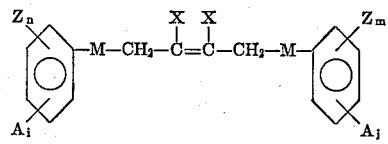

each X independently, forming either the cis or trans isomer, is F, Cl, Br, I or H where not more than one X is H,
each M independently is O or S,
each Z independently is Cl or Br,
each A independently is an inert substituent, such as F, I, methyl, phenyl, hydroxy, methoxy, nitro, carboxy, acetoxy, cyano, amino or sulfo,
$n$ and $m$ are integers of 1 to 5 provided that when $n=m=1$ then each Z and X is Br and M=O and provided that when one X is H then $n$ and $m$ are integers of 3 to 5, and
$i$ and $j$ are integers of 0 to 2 where $i \leq n-1$ and $j \leq m-1$ have been found to be compatible additives for polystyrene which do not discolor the polystyrene when extruded or molded at temperatures above 200° C., or even at temperatures above 220° C. Polystyrene containing these additives have been found to be fire retardant or self-extinguishing according to the Underwriters Class 2 test.

The compounds are prepared by reacting a 1,4-dihalo-2,3-substituted-2-butene with a substituted phenol or thiophenol in a two step reaction in the presence of a base, such as sodium or potassium hydroxide or carbonate. An inert solvent, such as an alcohol or ketone, is usually employed, though a solvent is not necessary. After reaction, the compounds of the invention may be isolated by any ordinary technique such as crystallization.

In the first step of the reaction, a 1,4-dihalo-2-butene of the general formula

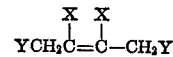

each Y is Cl or Br and
each X is as defined above is reacted in the presence of a base with one equivalent of a substituted benzene which has the general formula

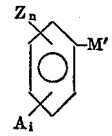

where: A, Z, $i$ and $n$ are as defined above and M'=OH or SH.

Such reaction gives as the predominant product the monosubstituted phenoxy or phenylthio 2-butene compound, although some of the 2-butene compound and disubstituted 2-butene are also present. In the second step of the reaction, an equivalent of a second phenol or thiophenol compound is reacted which has the same general formula as above except that the aromatic substituents $Z_m$ and $A_j$ replace $Z_n$ and $A_i$. Such reaction gives as the predominant product the compound of the invention. Of course, for compounds having the identical groups on either end, i.e., where M=M, $Z_n=Z_m$ and $A_i=A_j$, two moles of the substituted benzene per mole of the 2-butene would be reacted in a single step.

Representative examples of various compounds covered by the generic structure above include essentially three parts: the first phenoxy or phenylthio end, the substituted 2-butenylene radical in the middle and the second phenoxy or phenylthio end. Both the first and second phenoxy or phenylthio parts of the molecule can be selected from the same class so only two designations are necessary: one for the two substituted benzene radicals and the other for the 2-butenylene radical. Since the substituents on the aromatic portions may be in any position without materially affecting the fire retardancy, in the designation of the compounds, the numerical position will not be given because the substituents may be arranged in any manner on the five available positions. Reference numbers will be given for these substituted benzene radicals so that they may be easily combined to show specific examples of compounds covered by the generic formula. Representative examples of such radicals include: brominated phenoxy radicals, such as (1) bromophenoxy, (2) dibromophenoxy, (3) tribromophenoxy, (4) tetrabromophenoxy, (5) pentabromophenoxy, (6) dibromomethylphenoxy, (7) tribromodimethylphenoxy, (8) tetrabromophenylphenoxy, (9) fluorodibromophenoxy, (10) diiodotribromophenoxy, (11) hydroxytribromophenoxy, (12) methoxytetrabromophenoxy, (13) nitrodibromophenoxy, (14) dinitrotribromophenoxy, (15) carboxydibromophenoxy, (16) cyanotribromophenoxy, (17) aminotetrabromophenoxy, and (18) sulfotetrabromophenoxy; the brominated phenylthio radicals, such as those corresponding to the phenoxy radicals above where the oxy linkage is replaced by the thio linkage, such radicals being designated by the number of the bromophenoxy radical prime, i.e., N'; the chlorinated phenoxy radicals, such as those representative radicals for the bromine compounds except that all bromines are replaced by chlorines, such radicals being designated by the number of the bromophenoxy radical double prime, i.e., N''; the chlorinated phenylthio radicals, such as those of the bromophenoxy radicals above where the oxy linkage is replaced by a thio linkage and all bromines are replaced by chlorines, such radicals being represented by the number of the phenoxybromo radical triple prime, i.e., N'''; mixed chlorobromophenoxy radicals, such as (19) chlorobromophenoxy, (20) chlorodibromophenoxy, (21) dichlorotribromophenoxy, (22) chlorotribromomethylphenoxy, (23) trichlorobromophenoxy, (24) nitrochlorotribromophenoxy, and (25) aminochlorodibromophenoxy; and the mixed chlorobromophenylthio radicals, such as those represented by numbers 19–25 where the oxy is replaced with thio, such radicals being designated by the number prime, i.e., N'.

The second radical to be exemplified, the 2-butylene radical, only differs in the 2,3-substitution. The substituents in the 2 and 3 position, using alphabetical designation for each pair are: (a) Br, Br; (b) Br, H; (c) Br, Cl; (d) Br, F; (e) Br, I; (f) F, F; (g) F, Cl; (h) F, I; (i) F, H; (j) Cl, Cl; (k)Cl, I; (l) Cl, H; (m) I, I and (n) I, H.

Combining the phenoxy and phenylthio radicals with the 2-butenylene radicals by number and letter designation representative compounds exemplifying the general formula of the invention are: those having symmetrical end radicals, such as 1(a) 1 which denotes 1,4-bis(bromophenoxy)-2,3-dibromo-2-butene; 2'(c) 2'; 3''(b) 3''; 4'''(d) 4'''; 5(e) 5; 20(f) 20; 6'(g) 6'; 7''(h) 7''; 8'''(i) 8'''; 9(j) 9; 10'(k) 10'; 11''(l) 11''; 12'''(h) 12'''; 13(m) 13; 14(a) 14; 15'(c) 15'; 16''(b) 16''; 17'''(d) 17'''; 18(e) 18; 19'(f) 19'; 21(g) 21; 22'(h) 22'; 23(j) 23; 24'(i) 24' and 25(k) 25; and those having unsymmetrical radicals such as 1(m) 25 which denotes 1-bromophenoxy-4-aminochlorodibromophenoxy - 2,3-diiodo-2-butene; 3'(n) 24'; 3''(l) 23; 4'''(k) 22'; 5(j) 21; 7''(i) 20'; 6(h) 19; 8'(g) 18''''; 9(f) 17'; 10(e) 16''; 1(d) 15'''; 12(c) 14'; and 12(a) 13'''. All these compounds designated represent suitable fire retardant compounds. In the same manner as shown above, other combinations of these numbers can be chosen, and the resulting compound is examined in the light of the general formula to determine whether the compound is covered by the invention. All such compounds that meet the criteria of the general formula are desirable fire retardants and can be prepared by the method described above.

The compounds produced by such reaction may be any of the compounds of the general formula above. Preferred compounds are those where M is oxygen. Also preferred are compounds wherein at least one and preferably both X are Br and those compounds containing aromatic bromine, i.e., where Z is Br because of their effective fire retardant characteristics. Highly desirable are compounds where $n=3$ to 5. Compounds of the general formula containing about 6 to about 10 bromine atoms are also preferred because of their special effectiveness, and of special interest because of effectiveness and ease of preparation are 1,4-bis(tribromophenoxy)-2,3-dibromo-2-butene, i.e., wherein each X and each Z is Br, $n=m=3$, $i=j=0$ and M=oxygen; 1 - (tribromophenoxy) - 4 - (pentabromophenoxy) - 2,3 - dibromo-2-butene, i.e., where each X and Z is Br, $n=3$, $m=5$, $i=j=0$ and M=oxygen; 1,4 - bis[dibromonitrophenoxy] - 2,3-dibromo-2-butene, i.e., where each X and Z is Br, $m=n=2$, each A=NO$_2$, $i=j=1$ and M=oxygen; and 1,4-bis[dimethyltribromophenoxy] - 2,3 - dibromo-2-butene, i.e., where each X and Z is Br, $m=n=3$, and each A is methyl. From the economic view point, compounds containing symmetrical aromatic groups are preferred, i.e., where each M is the same, each $Z_n$= each $Z_m$ and each $A_i$= each $A_j$.

The compounds of the invention may suitably be added to any compatible resin in amounts sufficient to give the desired degree of fire retardancy. Although the amount of the fire retardant added to the resin may vary widely, additive levels of about 0.1 to 20 percent by weight of the resin usually give adequate protection, with amounts of about 1 to about 10 percent being preferred. The final concentration of the additive in the polymer may be obtained either by adding the desired concentration of the fire retardant to all of the resin or by adding resin having a very high concentration of the fire retardant additive to ordinary resin to form a mixture having the desired percentage of the fire retardant.

Although the compounds of the invention are effective fire retardants when used alone, other known additives may be used in addition to or in partial substitution for these compounds. Representative examples of other additives include antimony oxide, a peroxide, triethyl phosphate, dibromoneopentyl glycol or other brominated compound.

Any resin in which a compound of the invention is compatible may be made fire resistant by this invention, with resins containing polystyrene being of special interest. Representative examples of suitable resins that may be used with the fire retardant additives of the present invention include polystyrene, styrene-acrylonitrile polymers, such as those sold under the trade name Tyril®, acrylonitrile-butadiene-styrene polymers, such as those sold under the trade name Tybrene®, ethyl cellulose, polypropylene, polyurethanes and polyesters.

The fire retardant additives incorporated into resins may contain various stabilizers, such as tridecyl phosphite, barium-cadmium soaps and organo tin compounds, or other materials which inhibit discoloration. Although stabilizers are generally unnecessary with the pure fire retardants of the invention, commercial grades of the fire retardants sometimes contain impurities which cause discoloration at high temperatures. With proper stabilization or purified additive, however, fire retardant polystyrene may be molded or extruded at temperatures above 200° C. without degradation or discoloration.

SPECIFIC EMBODIMENTS

Example 1

To a 2 - liter three-necked flask equipped with a mechanical stirrer, condenser and ascarite drying tube, 1 liter of ethanol and 13.4 grams of 85% potassium hydroxide pellets were charged. When the base had been dissolved, 72 grams of 2,4,6-tribromophenol was added and dissolved. To this mixture 40 grams of trans-1,2,3,4-tetrabromo-2-butene was added along with an additional 500 ml. of ethanol. The mixture was heated at reflux with stirring for 30 hours, cooled and poured over an equal volume of ice with stirring. The resulting slurry was made basic with 2 N potassium hydroxide and the solid was collected by suction filtration. The crude product was washed 3 times with water and dried in vacuum at 80° C. The dried solid was crystallized once from 2.5 liters of o-dichlorobenzene to give 76.4 grams (81.5%) of 1,4-bis(2,4,6 - tribromophenoxy) - 2,3 - dibromo - 2 - butene which has a melting point of 254° to 256° C. with decomposition.

*Elemental analysis.*—Calcd. for $C_{16}H_8Br_8O_2$ (percent): C, 22.05; H, 0.93; Br, 73.36. Found (percent): C, 22.03, H, 0.98, Br, 74.0.

With a polystyrene resin sold under the trade name Styron 492, 4% based on the weight of the polystyrene of the 1,4-bis(2,4,6 - tribromophenoxy)-2,3 - dibromo-2-butene prepared was mechanically mixed. The mixture was heated to 225° C. and molded at that temperature in an ordinary mold. The temperature of 225° C. was chosen because it is the temperature normally employed in molding operations for this type of polystyrene. After cooling, the polystyrene showed no sign of discoloration, and there was essentially no alteration of the transparency. A portion of the molded polystyrene was tested for fire retardancy by the General Electric limiting oxygen index, LOI, test described in Combustion and Flame, 10, 135 (1966). This test gives the minimum mole fraction of oxygen in the ambient atmosphere that is necessary to maintain combustion of the sample. Higher LOI values show higher fire retardancy because more oxygen is required for burning. The LOI for molded Styron 492 was 0.183 without the additive and 0.246 with the additive. This information along with other examples is shown in Table I.

Examples 2–10

In the same manner as described in Example 1, other compounds of the invention were prepared, and the LOI was tested in Styron 492 at a 4 weight percent concentration. The results of these tests are shown in Table I.

TABLE I

L.O.I. of various fire retardants in Styron 492 at a 4 weight percent additive level

| Example | Additive[1] | L.O.I |
|---|---|---|
| 1 | (Br-phenyl)₂ with Br substituents | 0.245 |
| 2 | (phenyl)₂ | 0.218 |
| 3 | (Br-phenyl)₂ | 0.235 |
| 4 | Br-phenyl, Br₃-phenyl | 0.250 |
| 5 | (diBr-phenyl)₂ | 0.235 |
| 6 | (CH₃, diBr-phenyl)₂ | 0.250 |
| 7 | (CH₃, Br-phenyl)₂ variant | 0.250 |
| 8 | (NO₂, Br-phenyl)₂ | 0.200 |
| 9 | (diCl-phenyl)₂ | 0.250 |
| 10 | (CH₃, Br, CH₃-phenyl)₂ | 0.244 |

[1] 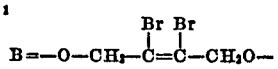

Examples 11–19 and Comparative Examples A and B

To determine the desirability of the fire retardants for use in polystyrene, 4% by weight of various additives were blended with Styron 492 and molded at 125°–180° C. The samples were purposely molded at these low temperatures to assure specimens that where as white as Styron 492. Small pieces of the samples were inserted in a preheated oven at a constant temperature for five minutes. If the sample remained white, the temperature of the oven was increased 5° C. and a fresh sample of the polymer was inserted into the oven. The temperature of the oven was incrementally increased and the tests repeated until the polymer became discolored. Table II shows the compounds examined and the temperature at which the samples began to turn color. Comparative Example A is a compound representative of U.S. 2,488,499 and Comparative Example B is representative of U.S. 3,372,141.

TABLE II

Thermal stability of the fire retardant in Styron 492

| Example | Additive[1] | Beginning of discoloration, °C. |
|---|---|---|
| 11 | (Br-phenyl)₂–B–(Br-phenyl)₂ | 240 |

TABLE II—Continued

| Example | Additive[1] | Beginning of discoloration, °C. |
|---|---|---|
| 12 | (structure) | 240 |
| 13 | (structure) | 240 |
| 14 | (structure) | 240 |
| 15 | (structure) | 240 |
| 16 | (structure) | 240 |
| 17 | (structure) | 240 |
| 18 | (structure) | 240 |
| 19 | (structure) | 240 |
| Comp. A | (structure) | 185 |
| Comp. B | (structure) | 220 |

[1] See footnote at bottom of TABLE I.

In the same manner as described in the examples above, other resins of styrene containing 0.1–20% by weight of other fire retardant additives of the present invention may be extruded or molded without discoloration at temperatures of 220° C. to produce a fire resistant resin.

We claim:
1. A compound of the formula

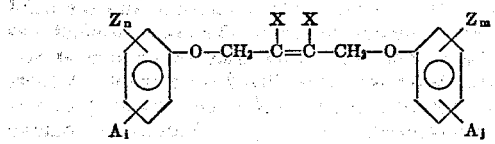

each X independently, forming either the cis or trans isomer, is F, Cl, Br, or I,
each Z independently is Cl or Br,
each A independently is an inert substituent, selected from the class consisting of F, I, methyl, phenyl, hydroxy, methoxy and nitro,
$n$ and $m$ are integers of 1 to 5 provided that when $n=m=1$ then each Z and X is Br, and
$i$ and $j$ are integers of 0 to 2 where $i \leq n-1$ and $j \leq m-1$, 2. The compound of claim 1 wherein at least one X is Br.
3. The compound of claim 2 wherein each X is Br.
4. The compound of claim 1 wherein each Z is Br.
5. The compound of claim 1 wherein $n=3$ to 5.
6. The compound of claim 1 containing 6 to 10 bromine.
7. The compound of claim 1 wherein each X and each Z are Br, $n=m=3$, $i=j=0$.
8. The compound of claim 1 wherein each X and each Z are Br, $n=3$, $m=5$, $i=j=0$.
9. The compound of claim 1 wherein each X and each Z are Br, $m=n=2$, each $A=NO_2$, $i=j=1$.
10. The compound of claim 1 wherein each X and each Z are Br, $n=m=3$, each A is methyl, $i=j=2$.
11. A compound of the formula

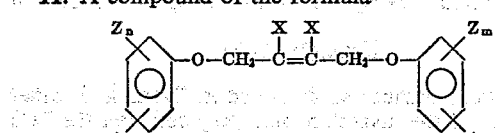

each X independently, forming either the cis or trans isomer, is F, Cl, Br, I or H where not more than one X is H,
each Z independently is Cl or Br,
each A is methyl,
$n$ and $m$ are integers of 1 to 5 provided that when $n=m=1$ then each Z and X is Br and provided that when one X is H then $n$ and $m$ are integers of 3 to 5, and
$i$ and $j$ are integers of 0 to 2 where $i \leq n-1$ and $j \leq m-1$.

References Cited
UNITED STATES PATENTS
| | | | |
|---|---|---|---|
| 2,399,330 | 4/1946 | Deebel | 260—613 R X |
| 2,488,497 | 11/1949 | Moyle | 260—613 R |
| 2,488,498 | 11/1949 | Moyle | 260—613 R |
| 2,488,499 | 11/1949 | Moyle | 260—613 R |

BERNARD HELFIN, Primary Examiner

U.S. Cl. X.R.

260—45.7, 45.9, 45.95, 609 E, 520, 479 R, 465 F, 571, 607 A